US009582743B2

(12) United States Patent
Akiyama et al.

(10) Patent No.: US 9,582,743 B2
(45) Date of Patent: Feb. 28, 2017

(54) IMAGE CONTENT DISPLAY SYSTEM AND DISPLAY CONTROLLER

(71) Applicant: Konica Minolta, Inc., Chiyoda-ku, Tokyo (JP)

(72) Inventors: Osamu Akiyama, Tama (JP); Shiro Umeda, Toyokawa (JP); Michio Takahashi, Aichi (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 14/726,983

(22) Filed: Jun. 1, 2015

(65) Prior Publication Data
US 2015/0347875 A1 Dec. 3, 2015

(30) Foreign Application Priority Data
Jun. 2, 2014 (JP) .................................. 2014-114108

(51) Int. Cl.
*G06K 15/00* (2006.01)
*G06F 3/12* (2006.01)
*G06Q 30/02* (2012.01)

(52) U.S. Cl.
CPC ......... *G06K 15/005* (2013.01); *G06F 3/1207* (2013.01); *G06F 3/1229* (2013.01);
(Continued)

(58) Field of Classification Search
USPC ................. 358/1.15, 1.1, 1.13; 345/676, 156
See application file for complete search history.

(56) References Cited

U.S. PATENT DOCUMENTS

2002/0039141 A1* 4/2002 Washisu ............... H04N 1/0044
348/231.6
2006/0288304 A1* 12/2006 Nomoto ............ G06F 17/30126
715/781
(Continued)

FOREIGN PATENT DOCUMENTS

JP 2004-179898 A 6/2004
JP 2010-086091 A 4/2010
(Continued)

OTHER PUBLICATIONS

Notice of Reasons for Rejection dated Sep. 23, 2016 issued in the corresponding Japanese Patent Application No. 2014-114108 and English translation (10 pages).

*Primary Examiner* — Jerome Grant, II
(74) *Attorney, Agent, or Firm* — Buchanan Ingersoll & Rooney PC

(57) ABSTRACT

An image content display system includes: a display device; a display controller that displays image content on the display device while switching a plurality of sets of image content; and an image forming apparatus that prints image information associated with image content displayed on the display device, wherein the display controller includes a first acquiring unit that acquires image content of a first content group, a second acquiring unit that acquires image content of a second content group, a determining unit that determines whether or not the image forming apparatus is in a printing enabled state, and a display control unit that displays the image content of the first content group, and switches image content to be displayed on the display device from the image content of the first content group to the image content of the second content group.

9 Claims, 15 Drawing Sheets

(52) U.S. Cl.
CPC .......... *G06F 3/1256* (2013.01); *G06F 3/1259* (2013.01); *G06F 3/1285* (2013.01); *G06Q 30/02* (2013.01)

(56) References Cited

U.S. PATENT DOCUMENTS

| | | | |
|---|---|---|---|
| 2010/0079786 A1 | 4/2010 | Yamada | |
| 2011/0038002 A1* | 2/2011 | Nakamura | G06F 3/121 358/1.15 |
| 2012/0243020 A1* | 9/2012 | Saito | B41J 3/46 358/1.13 |
| 2013/0050278 A1* | 2/2013 | Watari | H04N 1/00183 345/676 |
| 2013/0179808 A1 | 7/2013 | Kano | |
| 2014/0268227 A1* | 9/2014 | Nakata | H04N 1/00233 358/1.15 |

FOREIGN PATENT DOCUMENTS

| | | |
|---|---|---|
| JP | 2012-014319 A | 1/2012 |
| JP | 2013-125147 A | 6/2013 |
| JP | 2013-139131 A | 7/2013 |
| JP | 2014-099207 A | 5/2014 |

\* cited by examiner

FIG. 5A

| No | CONTENT NAME | DISPLAY PERIOD (SEC) | SPONSOR |
|---|---|---|---|
| 1 | IMAGE CONTENT A1 | 120 | X1 CO. |
| 2 | IMAGE CONTENT A2 | 40 | X2 CO. |
| 3 | IMAGE CONTENT A3 | 60 | X3 CO. |
| 4 | IMAGE CONTENT A4 | 90 | X4 CO. |
| 5 | IMAGE CONTENT A5 | 80 | X5 CO. |
| 6 | IMAGE CONTENT A6 | 70 | X6 CO. |

FIG. 5B

| No | CONTENT NAME | DISPLAY PERIOD (SEC) | SPONSOR |
|---|---|---|---|
| 1 | IMAGE CONTENT B1 | 120 | X1 CO. |
| 2 | IMAGE CONTENT B2 | 40 | X2 CO. |
| 3 | IMAGE CONTENT B3 | 60 | X3 CO. |
| 4 | IMAGE CONTENT B4 | 90 | X4 CO. |
| 5 | IMAGE CONTENT B5 | 80 | X5 CO. |
| 6 | IMAGE CONTENT B6 | 70 | X6 CO. |

IMAGE CONTENT DISPLAY SYSTEM AND
DISPLAY CONTROLLER

The entire disclosure of Japanese Patent Application No. 2014-114108 filed on Jun. 2, 2014 including description, claims, drawings, and abstract are incorporated herein by reference in its entirety.

BACKGROUND OF THE INVENTION

Field of the Invention

The present invention relates to an image content display system and a display controller, both configured to display image content, and to print information associated with image content.

Description of the Related Art

A digital signage system (so-called electronic signboard) has been widespread in recent years, as a system capable of displaying enterprise advertisement images and advertisement information on a display device such as a liquid crystal panel placed in towns, stores, public facilities, or other places where people often gather.

More recently, such a digital signage system has been proposed which offers information associated with an advertisement displayed on a display device (such as an advertising leaflet, a coupon ticket, and other information associated with advertisement) in a form printable by a printer, in response to a printing instruction input to a screen of the display device by touch operation or the like, so as to increase appeal effect to a user (for example, see JP 2013-125147 A, JP 2010-86091 A, and JP 2013-139131 A).

In displaying an advertisement, this digital signage system usually displays information (hereinafter referred to as "printing enabled state message") on the screen for notifying the user that printing of information associated with the advertisement is enabled.

In general, a printer has a function of spooling a received printing job. More specifically, a printer temporarily retains a printing job issued in response to an instruction from a user when the printer is in a printing disabled state under an out-of-paper or out-of-toner condition of the printer, for example. In this case, the use is compelled to wait for a long time until the printer is restored to a state capable of outputting printing matters containing associated information.

When this situation occurs, the user, who has issued the printing instruction in the belief that the printing enabled state message displayed on the screen of the display device is true, may feel uncomfortable. In this case, the advertisement may not only decrease customer appeal effect, but also give an unfavorable impression depending on circumstances.

These problems may arise from any types of image content display systems configured to display various types of image content (such as images of school curricula and public information issued from local governments), including the forgoing advertisement images and advertisement information, and to print information associated with the displayed image content.

SUMMARY OF THE INVENTION

The present invention has been made to solve the aforementioned problems, and an object thereof is to provide an image content display system, and a display controller included in this image content display system, both capable of minimizing a probability that a user will feel uncomfortable and have an unfavorable impression of a provider of a display image when an image forming apparatus comes into a printing disabled state.

To achieve the abovementioned object, according to an aspect, an image content display system reflecting one aspect of the present invention comprises: a display device; a display controller that displays image content on the display device while switching a plurality of sets of image content; and an image forming apparatus that prints image information associated with image content displayed on the display device, wherein the display controller includes: a first acquiring unit that acquires image content of a first content group containing, within an image, printing enabled state information for notifying a user that printing of the associated image information is enabled; a second acquiring unit that acquires image content of a second content group not containing the printing enabled state information within an image; a determining unit that determines whether or not the image forming apparatus is in a printing enabled state; and a display control unit that displays the image content of the first content group when the image forming apparatus is in the printing enabled state, and switches image content to be displayed on the display device from the image content of the first content group to the image content of the second content group when a state change of the image forming apparatus to a printing disabled state is determined during display of the image content of the first content group.

The display control unit preferably switches image content to be displayed on the display device from the image content of the second content group to the image content of the first content group when the determining unit determines that the state of the image forming apparatus is restored from the printing disabled state to the printing enabled state during display of the image content of the second content group.

Each of the sets of the image content of the second content group is preferably alternative content of the corresponding image content of the first content group. In this case, the display control unit preferably switches image content to be displayed on the display device to the image content of the second content group corresponding to the image content of the first content group which should be displayed under the printing enabled state when the determining unit determines that the image forming apparatus is in the printing disabled state during display of the image content of the first content group.

A display scheduled period is preferably allocated to each of the sets of the image content of the first and second content groups. In this case, the display control unit preferably switches image content currently displayed after an elapse of the display scheduled period of the corresponding image content in switching image content to be displayed on the display device between the first content group and the second content group.

To achieve the abovementioned object, according to an aspect, an image content display system reflecting one aspect of the present invention comprises: a display device; a display controller that displays image content on the display device while switching a plurality of sets of image content; and an image forming apparatus that prints image information associated with image content displayed on the display device, wherein the display controller includes: an acquiring unit that acquires the plurality of sets of image content; a determining unit that determines whether or not the image forming apparatus is in a printing enabled state; and a display control unit that displays, in displaying the image content, printing enabled state information notifying a user that printing is enabled while overlapping the printing enabled state information on an image of the image content when the image forming apparatus is in the printing enabled state, and deletes the printing enabled state information from a screen of the display device when a state change of the image forming apparatus to a printing disabled state is determined during display of the image content and the printing enabled state information.

The display control unit preferably displays the printing enabled state information on an image of image content when the determining unit determines that the state of the image forming apparatus is restored from the printing disabled state to the printing enabled state after deletion of the printing enabled state information from the screen of the display device.

A display scheduled period is preferably allocated to each of the plurality of sets of acquired image content. In this case, the display control unit preferably displays the printing enabled state information on the screen or deletes the printing enabled state information from the screen at the time of switching to subsequent image content after an elapse of the display scheduled period of image content currently displayed.

To achieve the abovementioned object, according to an aspect, a display controller that displays image content on a display device while switching a plurality of sets of image content, and allows an image forming apparatus to print image information associated with image content displayed on the display device, reflecting one aspect of the present invention, comprises: a first acquiring unit that acquires image content of a first content group containing, within an image, printing enabled state information for notifying a user that printing of the associated image information is enabled; a second acquiring unit that acquires image content of a second content group not containing the printing enabled state information within an image; a determining unit that determines whether or not the image forming apparatus is in a printing enabled state; and a display control unit that displays the image content of the first content group when the image forming apparatus is in the printing enabled state, and switches image content to be displayed on the display device from the image content of the first content group to the image content of the second content group when a state change of the image forming apparatus to a printing disabled state is determined during display of the image content of the first content group.

To achieve the abovementioned object, according to an aspect, a display controller that displays image content on a display device while switching a plurality of sets of image content, and allows an image forming apparatus to print image information associated with image content displayed on the display device, reflecting one aspect of the present invention, comprises: an acquiring unit that acquires the plurality of sets of image content; a determining unit that determines whether or not the image forming apparatus is in a printing enabled state; and a display control unit that displays, in displaying the image content, printing enabled state information notifying a user that printing is enabled while overlapping the printing enabled state information on an image of the image content when the image forming apparatus is in the printing enabled state, and deletes the printing enabled state information from a screen of the display device when a state change of the image forming apparatus to a printing disabled state is determined during display of the image content and the printing enabled state information.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 5A is a view illustrating an example of a display schedule of image content of the first content group;

FIG. 5B is a view illustrating an example of a display schedule of image content of a second content group;

DESCRIPTION OF THE PREFERRED EMBODIMENTS

Hereinafter, an embodiment of the present invention will be described with reference to the drawings. However, the scope of the invention is not limited to the illustrated examples.

First Embodiment

An image content display system applied to a digital signage system according to a first embodiment of the present invention is hereinafter described with reference to the drawings.

(1) General Configuration

Figure 1:
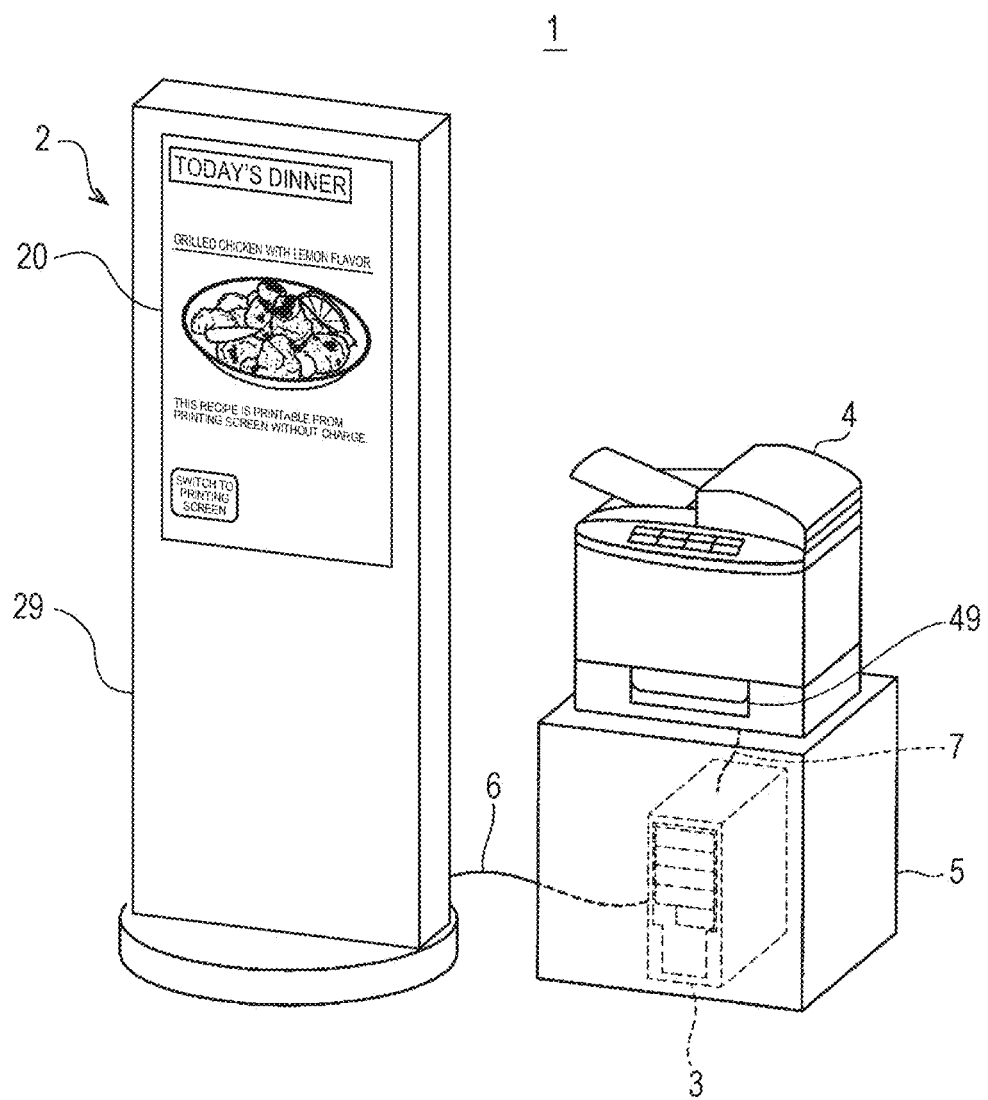
FIG. 1 is a view illustrating a general configuration of a digital signage system according to a first embodiment of the present invention.

FIG. 1 is a schematic view illustrating a configuration of a digital signage system according to this embodiment.

As illustrated in this figure, a digital signage system 1 is constituted by a display device 2, a display controller 3, a printer 4 and others, and placed in a store, a shopping street, or other busy streets, for example.

The display device 2 includes a display unit 20 disposed at a predetermined position of a vertically long box-shaped stand 29. The height of the display device 2 is determined in accordance with the average height of users (such as adult female persons) to whom advertisements of the digital signage system 1 are chiefly targeted, for example.

The display unit 20 includes a display panel such as a liquid crystal panel, and a transparent touch panel laminated on a screen of the display panel for detection of a touch position. The user touches the screen of the display unit 20 when issuing a predetermined printing instruction.

According to this embodiment, the display controller 3 is constituted by a personal computer housed in a rack 5. The display controller 3 transmits a printing job to the printer 4 under display screen control of the display device 2, or in response to a printing instruction received from the display device 2.

The printer 4 is constituted by a known electrophotographic color printer, for example, which receives a printing job execution instruction from the display controller 3, and executes printing in response to this instruction. The printer 4 is not limited to the electrophotographic type, but may be other types such as inkjet type.

The display device 2 and the printer 4 are connected with the display controller 3 via USB cables 6 and 7, respectively.

Figure 2:
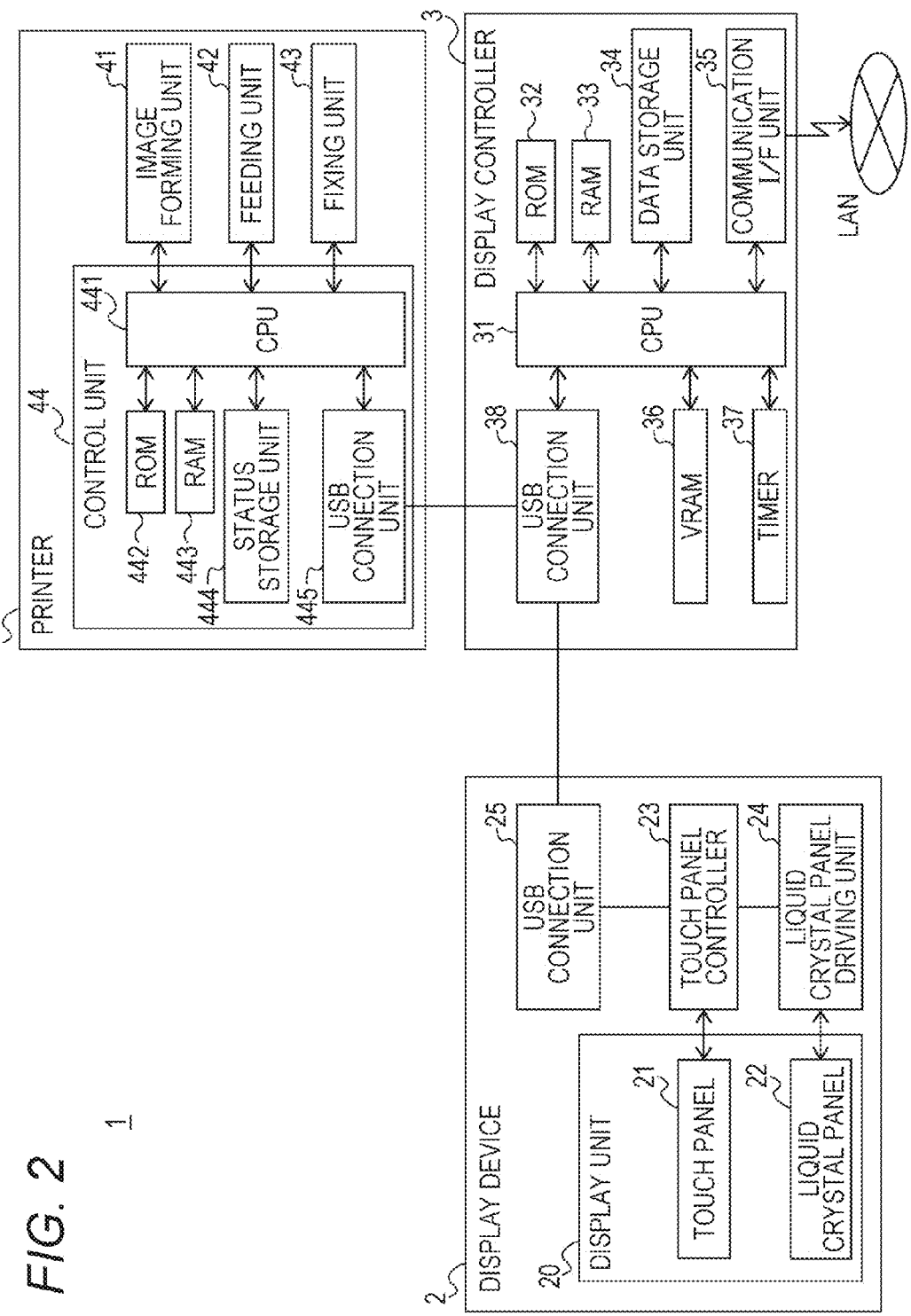
FIG. 2 is a block diagram illustrating a configuration of control systems of a display device, a display controller, and a printer included in the digital signage system.

(2) Configuration of Control Systems of Display Device, Display Controller, and Printer FIG. 2 is a block diagram illustrating a configuration of control systems of the display device 2, the display controller 3, and the printer 4.

(2-1) Display Device

The display device 2 includes the display unit 20 which contains the touch panel 21 laminated on a screen of a liquid crystal panel 22, a touch panel controller 23, a liquid crystal panel driving unit 24, and a USB connection unit 25.

The touch panel controller 23 drives the touch panel 21, and receives a signal from the touch panel 21. The touch panel controller 23 detects a touch position of a user based on the signal received from the touch panel 21, and transmits the detection result to the display controller 3 via the USB connection unit 25.

The liquid crystal panel driving unit 24 displays a color image by driving the liquid crystal panel 22 based on image data received from the display controller 3 via the USB connection unit 25.

(2-2) Display Controller

The display controller 3 includes a CPU (Central Processing Unit) 31, a ROM (Read Only Memory) 32, a RAM (Random Access Memory) 33, a data storage unit 34, a communication interface (I/F) unit 35, a VRAM (Video Random Access Memory) 36, a timer 37, a USB connection unit 38, and others.

The CPU 31 executes programs for controlling display contents on the display device 2, and issuing a printing job to the printer 4 in response to an instruction from the display device 2. The ROM 32 is a storage for storing the foregoing programs. The RAM 33 becomes a work area when the CPU 31 executes the programs.

The data storage unit 34 stores image content to be displayed on the display device 2, printing data on image information associated with image content, and others.

The "image content" in this context refers to one or a plurality of sets of still image data, one or a plurality of sets of dynamic image data, or a combination of these data. The image content further includes data on music, voices (narration), characters or the like combined with the above data.

The communication I/F unit 35 is an interface such as a LAN card and a LAN board for connection with LAN.

The VRAM 36 is a memory for temporarily storing image data to be displayed on the touch panel 21.

The timer 37 is chiefly used for managing display periods of image content.

The CPU 31 reads image content from the data storage unit 34, and displays the read image content on the display device 2. More specifically, the CPU 31 initially stores read image content in the VRAM 36, and then allows the liquid crystal panel driving unit 24 of the display device 2 to display the image content on the liquid crystal panel 22.

In addition, the CPU 31 determines contents of an instruction received from the user, based on information on the touch position of the user transmitted from the touch panel controller 23 of the display device 2, and a memory address of an icon image currently displayed on the screen. Moreover, the CPU 31 periodically inquires the printer 4 about the current status of the printer 4 to determine whether or not the printer 4 is in a printing enabled state. Furthermore, the CPU 31 switches image content based on an instruction from the user and status information received from the printer 4, and issues a printing job to the printer 4. These processes will be detailed later.

(2-3) Printer

The printer 4 includes an image forming unit 41 which forms a toner image by a known electrophotographic method based on a printing job transmitted from the display controller 3, and transfers the formed toner image to printing paper. The printer 4 further includes a feeding unit 42 for feeding printing paper, a fixing unit 43 for thermally fixing the toner image transferred to the printing paper, and a control unit 44 for controlling these units.

The control unit 44 includes a CPU 441, a ROM 442, a RAM 443, a status storage unit 444, a USB connection unit 445, and others.

The CPU 441 executes programs for controlling the image forming unit 41, the feeding unit 42, and the fixing unit 43. The ROM 442 is a storage for storing various types of programs executed by the CPU 441. The RAM 443 becomes a work area when the CPU 441 executes the programs.

The status storage unit 444 stores information indicating a state of the printer 4 (hereinafter referred to as "status information"). An initial value of the status information is set to "00", for example. The CPU 441 having detected an error updates the value of the status information to a value of a corresponding error code. The status information is kept at the initial value (="00") while the printer 4 is operating in a normal condition.

The error code becomes "01" under an out-of-paper condition, "02" under an out-of-toner condition, and "03" under a paper jam condition, for example.

The printer 4 contains a paper sensor for detecting whether or not printing paper is stored in a feed cassette 49 (FIG. 1), a toner sensor for detecting a toner residual amount within a toner cartridge, a paper passage sensor for detecting passage of printing paper through a conveyance path, and other types of sensors (none of sensors shown). Each of these sensors is constituted by a known sensor such as a transmission type photo-sensor.

The CPU 441 detects the presence or absence of an error based on output results obtained from the respective sensors, updates status information contained in the status storage unit 444 in accordance with the detection results thus obtained, and transmits the status information to the display controller 3 when receiving a status information request from the display controller 3.

(3) Image Content Displayed on Display Device

Figure 3C:
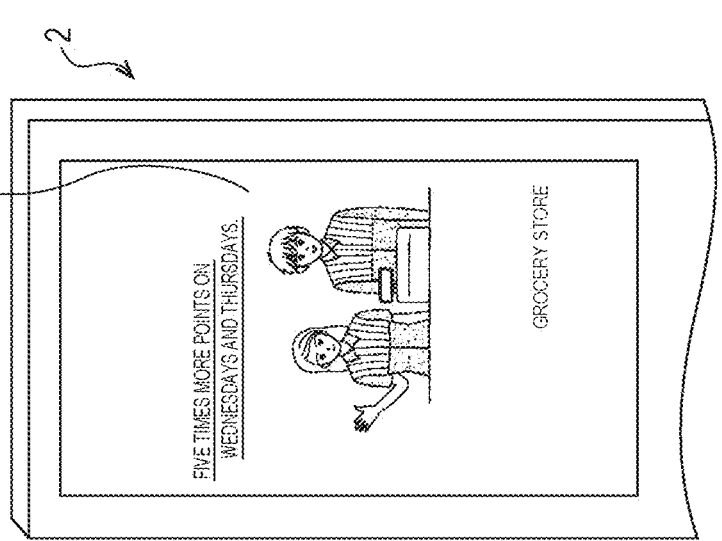
FIG. 3C illustrates an example of image content not containing any message associated with printing.
Figure 3B:
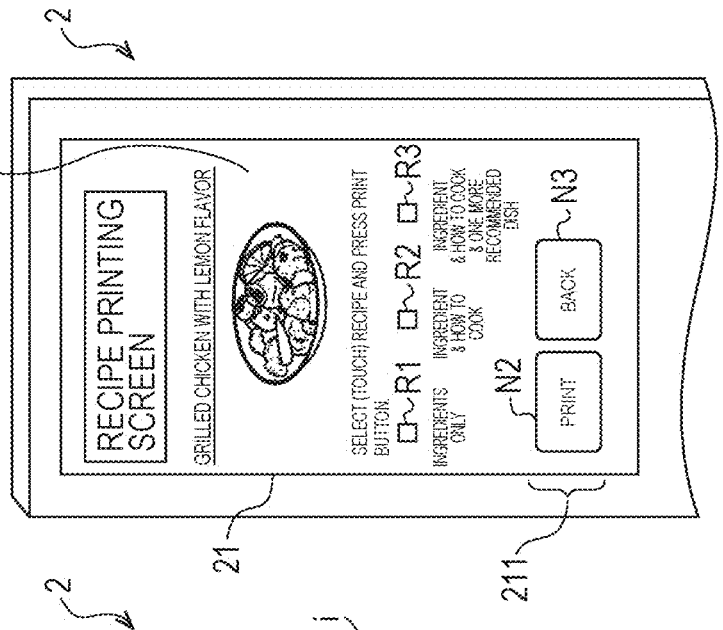
FIG. 3B is a view illustrating an example of a printing screen.
Figure 3A:
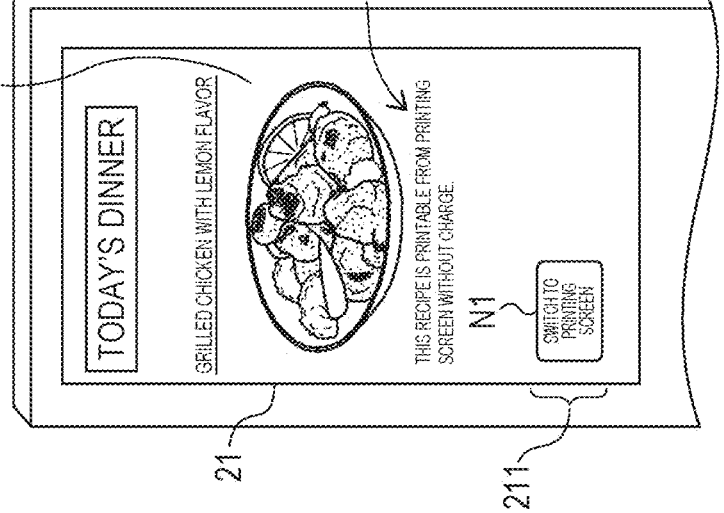
FIG. 3A illustrates an example of image content containing a printing enabled state message and displayed on the display device.

FIG. 3A is a view illustrating an example of image content displayed on the display device 2 under control by the display controller 3.

As illustrated in this figure, image content A which introduces a dish recommended for "today's dinner" contains from the beginning (incorporate as image data beforehand), a message i notifying that this recipe is printable (printing enabled state message, saying "this recipe is printable from printing screen without charge" according to this embodiment). The image content A are presented by a sponsor such as a grocery store, for example.

FIG. 3B illustrates an example of a printing screen displayed when the user having read the printing enabled state message i of the image content A presses a printing screen selection button N1.

Printing is executed when the user (customer) selects one of three types of recipes R1 through R3 by touching a corresponding check box on a recipe printing screen G illustrated in FIG. 3B, and presses a print button N2 on the printing screen G.

The CPU 31 of the display controller 3 determines that a function or a command corresponding to the button or check box displayed at the corresponding position has been selected based on a touch position detection signal indicating a user touch position on the touch panel 21 and transmitted from the touch panel controller 23 of the display device 2.

When the printing enabled state message i illustrated in FIG. 3A is displayed in a printing disabled state caused by an error (such as out-of-paper condition) in the printer 4, the user may misunderstand the current state as a printing enabled state. In this case, the user may press the printing screen selection button N1, select a recipe through the subsequent printing screen G illustrated in FIG. 3B, and then press the print button N2 to print the selected recipe.

In this scenario, the user is compelled to wait for long, and finally recognizes that the printer 4 is in the printing disabled state. The user having recognized this fact may feel uncomfortable, and suffer from inconveniences. In addition, this discomfort given to the user may lead to a bad impression of the sponsor presenting this image content.

According to this embodiment, therefore, image content B not containing any message associated with printing as illustrated in FIG. 3C is displayed, for example, so as to eliminate the possibility of execution of printing operation by the user when the printer 4 is in the printing disabled state.

A group of the image content A containing the printing enabled state message i are hereinafter referred to as "first content group", while a group of the image content B containing no message about printing are hereinafter referred to as "second content group".

Figure 4:
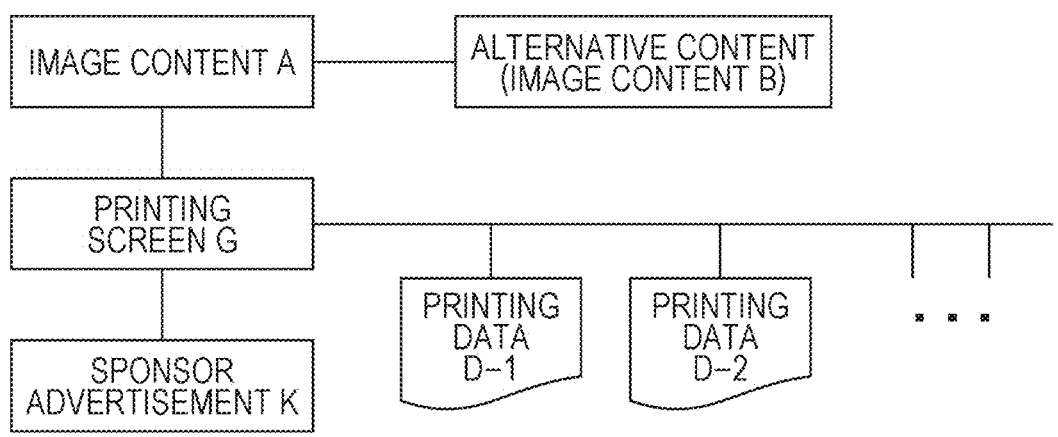
FIG. 4 is a view illustrating a relationship between image content of a first content group and other images according to the first embodiment.

FIG. 4 illustrates a relationship between image content used in this embodiment and other image information.

The image content B is positioned as alternative content of the image content A. Layers lower than the image content A include the printing screen G (screen content) for issuing printing instructions discussed above, printing data D-1, D-2 and others as associated information for printing recipes, and a sponsor advertisement K (advertisement content (described later)), for example.

FIG. 5A is a view illustrating an example of a schedule (program) Y1 associated with display of the image content A of the first content group.

As illustrated in this figure, the display schedule Y1 is constituted by items of display number (No.), image content name, display period, and sponsor name. Image content A1 through A6 are shown herein as scheduled image content to be displayed. Display periods determined by contracts with respective sponsors are stored in a display period column.

The display controller 3 reads the image content A1 through A6 shown in the display schedule Y1 from the data storage unit 34 in the order of the display numbers, and sequentially displays the image content A1 through A6 on the display device 2.

FIG. 5B is a view illustrating a display schedule Y2 of the image content B of the second content group.

For example, image content B1 shown in this figure is alternative content of the image content A1. Accordingly, the sponsor of the image content B1 is an X1 company which is the same sponsor as that of the image content A1, and the display schedule period of the image content B1 is similarly the same period as that of the image content A1.

In this case, the alternative content has been prepared for the same sponsor, wherefore the display period determined by the contract is fulfilled even when the printer 4 is in the printing disabled state.

This applies to the other image content B2 through B6 prepared for the same sponsors as the sponsors of the image content A2 through A6, as alternative content of the image content A2 through A6 which should be displayed when the printer 4 is in the printing enabled condition.

The display controller 3 constantly checks whether or not the printer 4 is in the printing enabled state (state determining process). When the printer 4 is in the printing disabled state, the display controller 3 switches image content to be displayed on the display device 2 from the first content group to the second content group. Then, the display controller 3 reads the image content (B1 through B6) and displays the read image content on the display device 2 based on the display schedule Y2 (image content display controlling process).

The display schedules Y1 and Y2 are stored in the data storage unit 34 of the display controller 3 together with image content.

The state determining process for determining the state of the printer 4 and the image content display controlling process for controlling display of the display device 2, both the processes executed by the display controller 3, are hereinafter described in detail.

(4) Printer State Determining Process

Figure 6:
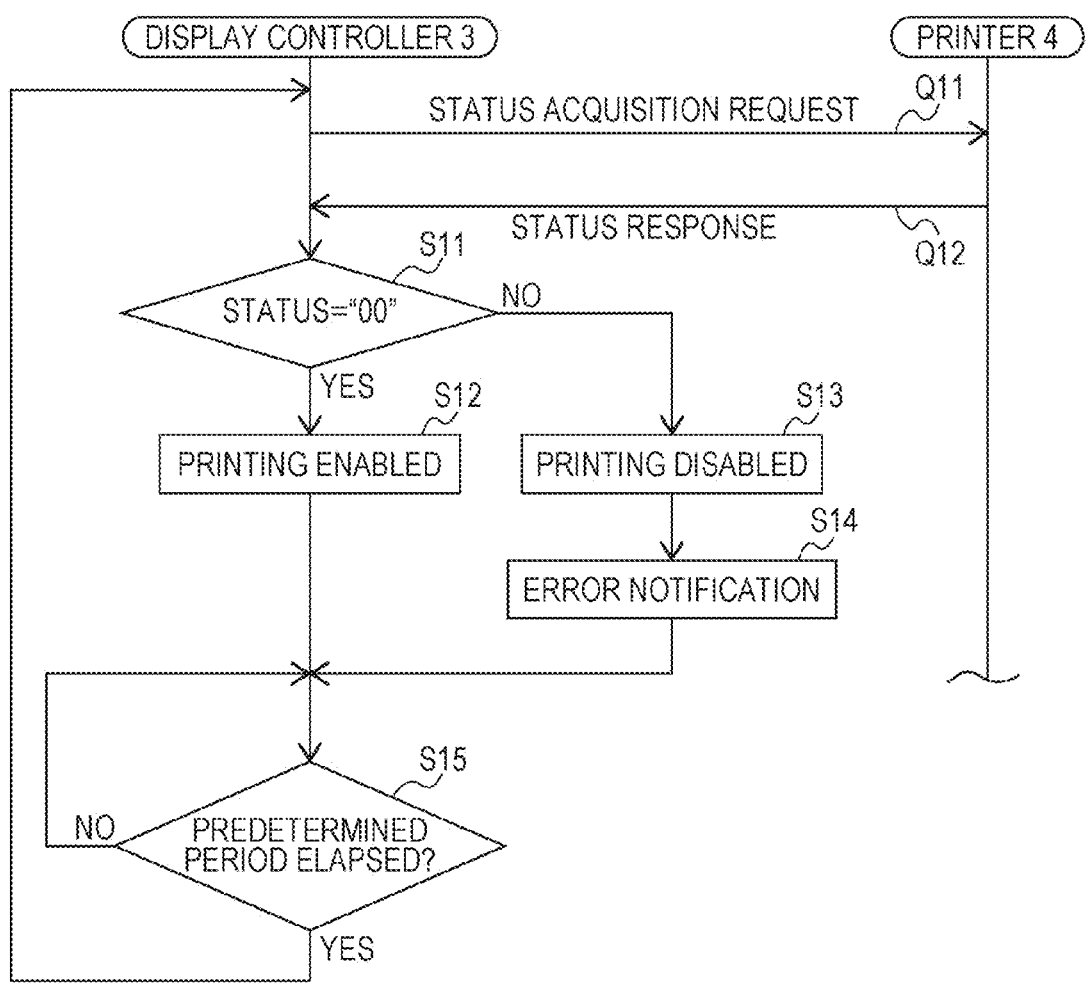
FIG. 6 is a view illustrating an example of a printer state determining sequence.

FIG. 6 is a view showing an example of a sequence in the printer state determining process.

As illustrated in this figure, the display controller 3 initially transmits a status acquisition request to the printer 4 (Q11) in the printer state determining process. The status acquisition request Q11 is issued (transmitted) from the CPU 31 of the display controller 3.

The CPU 441 of the printer 4 having received the status acquisition request Q11 reads status information from the status storage unit 444, and responds to the status acquisition request Q11 (Q12).

The display controller 3 determines (checks) whether or not the printer 4 is in the printing enabled state based on the status information response (step S11).

More specifically, when the status information is "00" (step S11: Yes), the display controller 3 determines that the printer 4 is in the normal condition and thus in the printing enabled state (step S12). When the status information is not "00" (status information "00") (step S11: No), the display controller 3 determines that any error is caused in the printer 4. In this case, the display controller 3 determines that the printer 4 is in the printing disabled state (step S13), and notifies a system manager about the error (step S14). According to this embodiment, the display controller 3 sends an electronic mail for notification.

When no status information response is given, i.e., when the power source of the printer 4 is turned off, or when the USB cable 7 connected with the display controller 3 is separated, the display controller 3 does not determine the status information as "00". In this case, the display controller 3 determines that the printer 4 is in the printing disabled state based on "No" in step S11.

When the error is canceled by the system manager, the status information in the status storage unit 444 of the printer 4 is reset to the initial value (="00").

The display controller 3 having made these determinations transmits the status acquisition request Q11 to the printer 4 after an elapse of a predetermined time (such as 5 seconds) (step S15: Yes), whereafter cyclically repeats the printer state checking process.

(5) Image Content Display Controlling Process (5-1) Outline

The display controller 3 executes the image content display controlling process for controlling image content display of the display device 2 in a manner described hereinbelow, while periodically executing the foregoing printer status determining process in parallel with the image content display controlling process.

Figure 7:
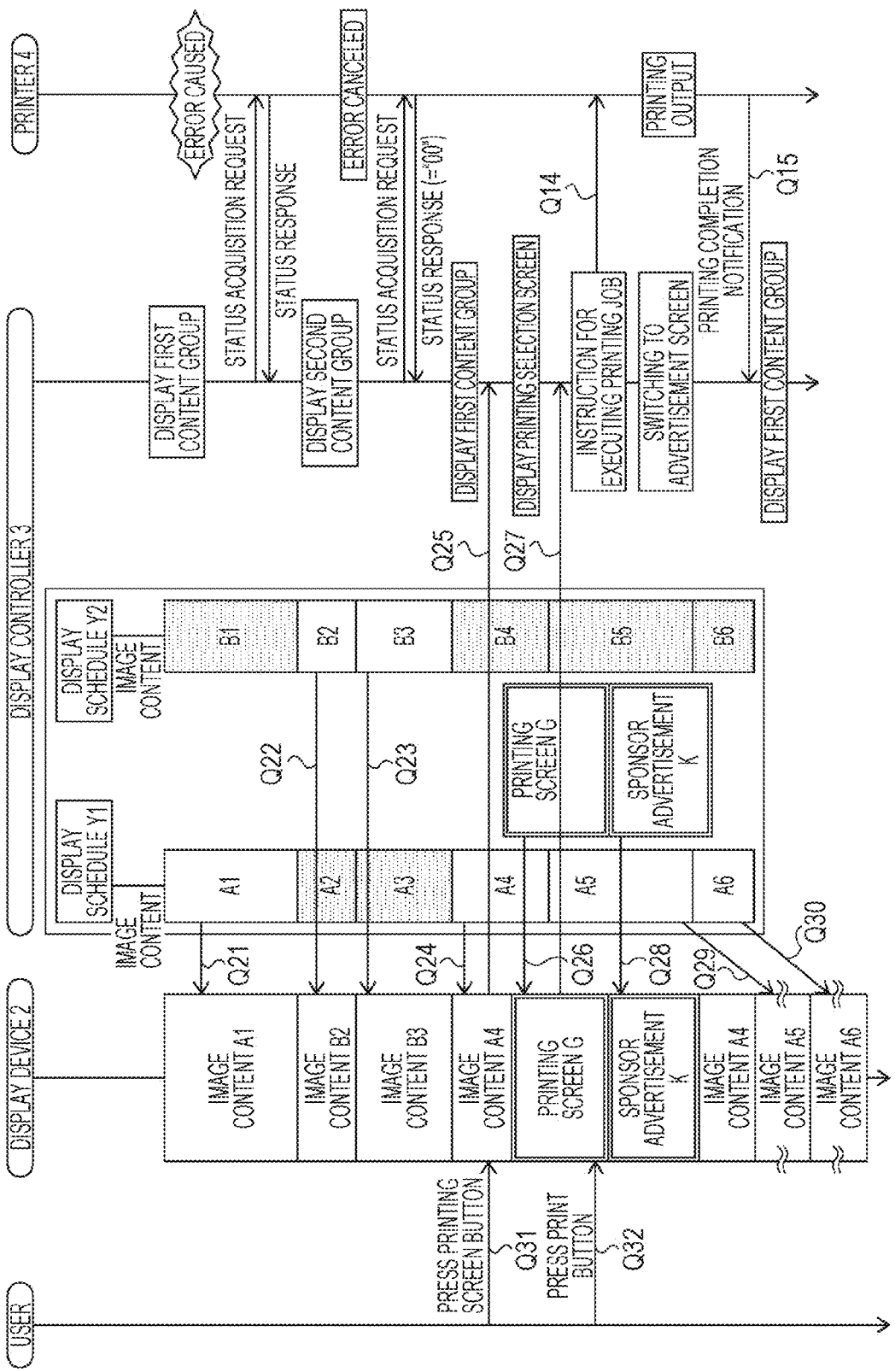
FIG. 7 is a view illustrating an example of sequences executed by the display device, the display controller, and the printer in an image content display controlling process.

FIG. 7 shows an example of sequences executed by the display device 2, the display controller 3, and the printer 4 at the time of the image content display controlling process.

Initially, the display controller 3 reads image content A1 based on the display schedule Y1 of the first content group, and transmits image data (containing dynamic data) of the image content A1 to the display device 2 to display the image data on the display device 2 (Q21).

When determining that the printer 4 is in the printing disabled state based on the foregoing printer state determining process during display of the image content A1, the display controller 3 switches the image content displayed on the display device 2 from the first content group to the second content group.

When the image content is switched during display of the image content A1, the benefit of the sponsor may decrease with reduction of the advertisement effect caused by shortening of the display period. In addition, when the content A1 contains dynamic images, or voices such as music and narration, the user viewing the image content A easily notices a change of the display screen and feels uncomfortable.

On the other hand, each set of the image content containing an advertisement is not scheduled to have a long display period. Accordingly, when it is determined that the printer 4 is in the printing disabled state during display of the image content A1, the probability that the user issues a printing instruction is relatively low during a short period from the determination of the printing disabled state to the elapse of the remaining display schedule period of the corresponding image content.

According to this embodiment, therefore, the image content is switched after an elapse of the display scheduled period allocated to the image content currently displayed. In this case, the display controller 3 selects, at the time of display of the subsequent image content A2, the image content B2 of the second content group corresponding to the alternative content of the image content A2 after an elapse of the display scheduled period of the image content A1, and displays the image content B2 on the display device 2 (Q22).

Thereafter, the display controller 3 reads the subsequent image content B3 in the order shown in the display schedule Y2 of the second content group, and displays the image content B3 on the display device 2 until the error is canceled by the system manager (Q23).

When the error is canceled, the status information about the printer 4 returns to "00". Accordingly, the display controller 3 determines that the printer 4 has returned to the printing enabled state based on the state determining process to be executed later.

In response to this determination, the display controller 3 switches the image content displayed on the display device 2 from the second content group to the first content group. In this case, the image content is switched after an elapse of the display scheduled period of the second content group currently displayed, so as to avoid discomfort of the user due to the screen selection and retain the benefit of the sponsor.

Accordingly, the display controller 3 selects, at the time of display of the subsequent image content B4, the image content A4 of the first content group which should be displayed in the normal condition after an elapse of the display scheduled period of the image content B3, and displays the image content A4 on the display device 2 (Q24).

It is assumed herein that the image content A illustrated in FIG. 3A is displayed on the display device 2 as the image content A4.

When the user having viewed the printing enabled state message i presses the printing screen selection button N1 during display of the image content A4 (Q31), the display device 2 detects the touch position and outputs information on this position to the display controller 3 (Q25). In this case, the display device 2 generates an input signal indicating that the printing screen selection button N1 has been pressed, and outputs the input signal to the display controller 3.

The display controller 3 receives a printing screen switching instruction from the user and displays the printing screen G (FIG. 3B) on the display device 2 (Q26), based on recognition that the printing screen selection button N1 has been pressed, with reference to the touch position information received from the display device 2 and the memory address of the printing screen selection button N1 within the VRAM 36.

In the following description, such an abbreviated expression "receiving an instruction for something from the user" is used for expressing a process executed by the display controller 3 for specifying contents of an instruction received from the user based on information on the touch position of the touch panel 21 received from the display device 2 with reference to the memory address of the image of the message or button displayed on the display device 2.

Thereafter, the user further selects the type of recipe through the printing screen G of the display device 2, and presses the print button N2 (Q32). The display controller 3 receives a printing instruction issued thereby for the selected recipe (Q27).

The display controller 3 creates a printing job to which image data on the selected recipe is attached, and transmits the created printing job to the printer 4 to issue an instruction for executing the printing job (Q14). The printer 4 outputs printing based on the received printing job.

The display controller 3 displays the sponsor advertisement K on the display device 2 (Q28) during output of printing from the printer 4.

The sponsor advertisement K is a special advertisement for the user waiting for the output of printing. For example, the sponsor advertisement K contains an advertisement of foodstuff to be used for the dish, seasonings, or drink suitable for the dish, or other advertisements offering appeal effect.

When receiving a notification that the printing output from the printer 4 has been completed (printing completion notification) (Q15), the display controller 3 temporarily returns the display of the display device 2 from the sponsor advertisement K to the image content A4 displayed before the switching (Q29), whereafter the display controller 3 sequentially displays the image content A5, A6 and others of the first content group in the order shown in the display schedule Y1.

(5-2) Flowchart

Figure 8:
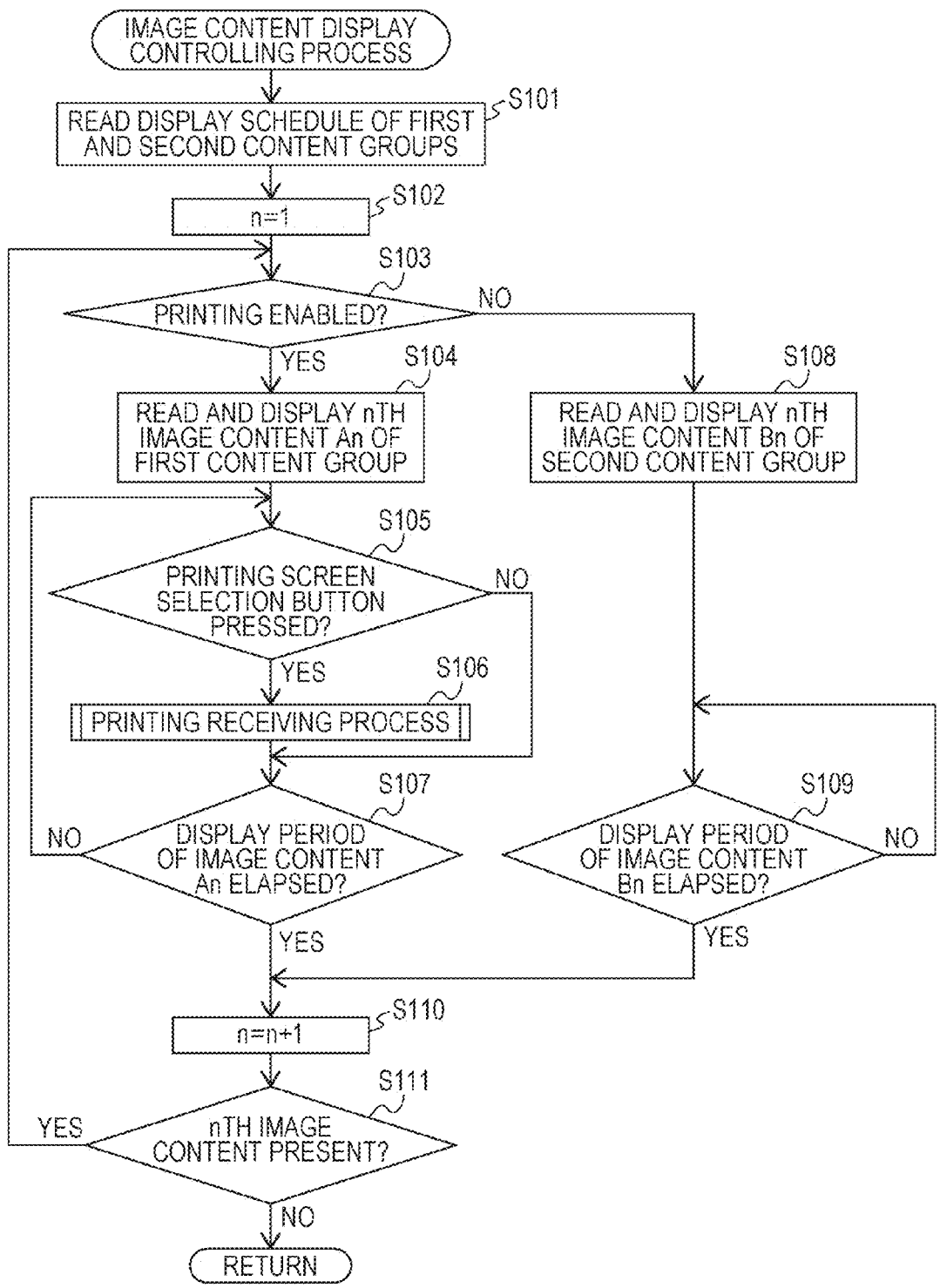
FIG. 8 is a flowchart showing an example of the "image content display controlling process" executed by the display controller according to the first embodiment.

FIG. 8 is a flowchart showing an example of the image content display controlling process executed by the CPU 31 of the display controller 3.

As illustrated in this figure, the CPU 31 of the display controller 3 initially reads the display schedule Y1 of the first content group and the display schedule Y2 of the second content group stored in the data storage unit 34 (step S101), and sets a counter value n indicating the number of the displayed image content to 1 (step S102). This counter value is stored in the RAM 33, for example.

Then, the CPU 31 of the display controller 3 checks whether or not the printer 4 is currently in the printing enabled state (step S103).

According to this embodiment, the state determining process (FIG. 6) is periodically executed as discussed above, and the check result (whether or not the current state is the printing enabled state) is updated and stored in the RAM 33 of the display controller 3, for example. The CPU 31 determines whether or not the printer 4 is currently in the printing enabled state by checking the contents of the check result thus stored.

The state determining process shown in FIG. 6 may be executed every time step S103 is performed.

When the printer 4 is in the printing enabled state (step S103: Yes), the CPU 31 of the display controller 3 reads nth image content An corresponding to the nth image content from the data storage unit 34 with reference to the display schedule Y1, and displays the image content An on the display device 2 (step S104).

When the printing screen selection button N1 (see FIG. 3A) is pressed by the user (step S105: Yes) on the display screen, the display controller 3 initiates a process for receiving a printing instruction from the user (printing receiving process) (step S106).

When the printing screen selection button N1 is not pressed (step S105: No), step S106 is skipped.

Figure 9:
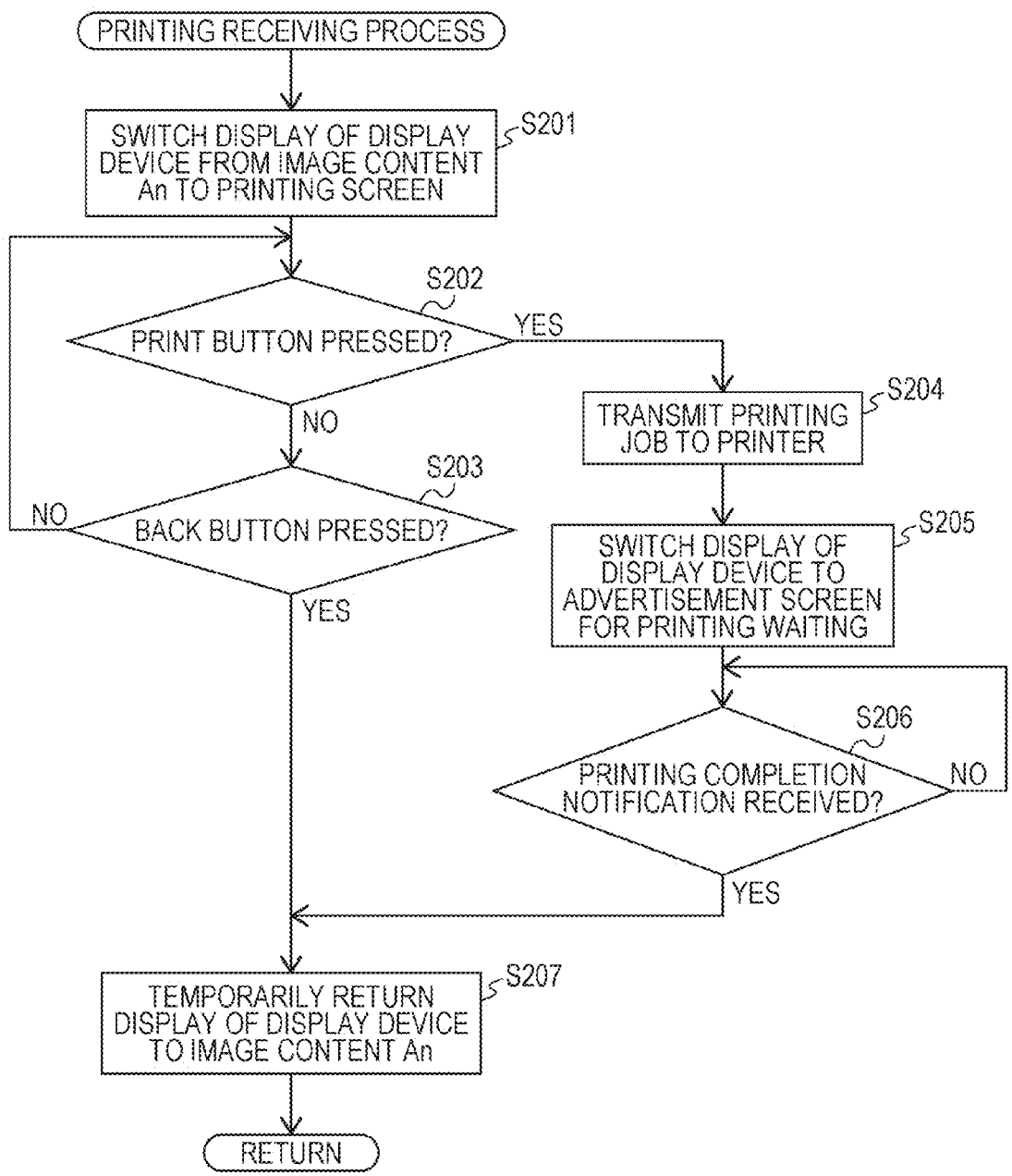
FIG. 9 is a sub routine showing content of a "printing receiving process" in step S106 in FIG. 8.

FIG. 9 is a flowchart showing contents of a sub routine of the "printing receiving process" executed in step S106.

As shown in this figure, the display controller 3 initially switches the display of the display device 2 from the image content An currently displayed to the printing screen G (see FIG. 3B) for designating printing (step S201).

When the print button N2 is pressed on this screen after selection of any one of the recipes R1 through R3 (step S202: Yes), the display controller 3 creates a printing job based on the contents selected by the user on the printing screen G, and transmits the printing job to the printer 4 (step S204). The printer 4 having received the printing job outputs printing. The display controller 3 having transmitted the printing job to the printer 4 switches the display of the display device 2 from the printing screen G to the sponsor advertisement K (FIG. 3C) for the user who are waiting for completion of printing (step S205).

After receiving a printing completion notification from the printer 4 (step S206: Yes), the display controller 3 proceeds to step S207. In this step, the display controller 3 temporarily restores the display of the display device 2 to the image content An, and then returns to the flowchart of the display controlling process shown in FIG. 8.

On the other hand, when the print button N2 is not pressed in step S202 (step S202: No), the display controller 3 does not execute steps S204 through S206 discussed above, but determines whether or not a back button N3 is pressed (step S203). When determining that the back button N3 has been pressed (step S203: Yes), the display controller 3 proceeds to step S207. In this step, the display controller 3 restores the display of the display device 2 to the image content An, and then returns.

It is possible that the elapsed time after the initial switching to the image content An exceeds the display scheduled period allocated to the image content An at the time of arrival at step S207 due to interruption of printing instruction operation by the user and printing processing by the printer 4 after the switching to the printing screen, for example. According to this embodiment, however, the image content displayed when the user initially issued the instruction for switching to the printing screen G is temporarily restored in this situation so that the user does not have a feeling of strangeness.

According to this embodiment, the display controller 3 again returns to step S202 and waits for a press of the printing screen selection button N1 when the back button N3 is not pressed (step S203: No). However, it is possible that the user does not operate the printing screen and goes away while leaving the printing screen as it is. For dealing with this situation, the display controller 3 may be forcedly returned to step S207 to restore the display to the image content An when the printing screen selection button N1 is not pressed within a predetermined period (such as 30 seconds) after the switching to the printing screen G.

Returning to FIG. 8, the display controller 3 determines whether or not the display scheduled period of the restored image content An has elapsed in step S107. When determining that the display scheduled period has not elapsed yet (step S107: No), the display controller 3 returns to step S105 to wait for a press of the printing screen selection button. When determining that the display scheduled period has elapsed (step S107: Yes), the display controller 3 shifts to step S110 to increment the counter value n by "1".

When determining that the printer 4 is not in the printing enabled state in step S103, the display controller 3 reads image content Bn corresponding to the nth image content of the second content group (see FIG. 3C) in step S108, and displays the image content Bn on the display device 2. After an elapse of the display scheduled period (step S109: Yes), the display controller 3 shifts to step S110 to increment the counter value n by "1".

After the increment of the counter value in step S110, the display controller 3 determines whether or not the nth image content is present with reference to the display schedule of the first or second content group (step S111) to determine whether or not image content to be displayed still remains. When such image content remains (step S111: Yes), the display controller 3 returns to step S103 to determine which of the first and second content groups to be displayed for image content display based on the determination whether or not the current state is the printing enabled state. Thereafter, the display controller 3 repeats the processes of steps S104 through S109 discussed above.

Switching of the image content to be displayed on the display device 2 between the second content group and the first content group is performed in this manner.

As noted above, the image content of the first content group and the image content of the second content group are provided in correspondence with each other, wherefore the number of sets of image content included in the first content group is equivalent to the number of sets of image content included in the second content group. Accordingly, either the display schedule of the first content group or the display schedule of the second content group may be referred to in step S111.

According to the image content display controlling process in this embodiment, therefore, image content to be subsequently displayed on the display device 2 is switched from the first content group to the second content group not containing display of the printing enabled state message when the state of the printer 4 is changed from the printing enabled state to the printing disabled state. In this case, the user does not have an idea nor a motive of printing, and therefore does not probably have a feeling of discomfort produced by failure in fulfillment of an expectation for printing.

In addition, no sign is displayed for indicating the printing disabled state of the printer 4 caused by the error. In this case, the user is not disappointed at the fact that the printer 4 normally in the printing enabled state is currently in the printing disabled state by chance due to the error of the printer 4, and therefore does not have a bad impression of the sponsor presenting the corresponding image content.

When the error of the printer 4 is canceled by the system manager, the state of the printer 4 is restored to the printing enabled state (step S103: Yes). Accordingly, the display controller 3 reads the image content An based on the display schedule Y1 and displays the image content An on the display device 2 to again notify the user that printing of the associated printing information is enabled.

According to this embodiment, image content of the first or second content group is read and displayed (step S104 or step S108) in accordance with results of the check whether or not the current state is the printing enabled state (step S103) only after an elapse of the display scheduled period of the image content currently displayed (Yes in step S107 or S109), even under the determination that the state of the printer 4 has been changed according to the state determining process. Accordingly, the user does not have a feeling of discomfort caused by sudden switching of the image content currently displayed. In addition, damage to the benefit of the sponsor is avoided.

According to this embodiment, the display controller 3 functions as a first acquiring unit for acquiring image content of the first content group, and a second acquiring unit for acquiring image content of the second content group when executing the process in step S104 or step S108 in FIG. 8.

Moreover, the display controller 3 functions as a determining unit which determines whether or not the printer 4 (image forming apparatus) is in the printing enabled state when executing step S11 in FIG. 6 (or step S103 in FIG. 8).

Furthermore, in executing the "image content display controlling process" in FIG. 8, the display controller 3 functions as a display control unit which sequentially displays image content of the first content group on the display device during the printing enabled state of the image forming apparatus, and sequentially displays image content of the second content group on the display device when determining that the image forming apparatus is in the printing disabled state.

Second Embodiment (1) Outline

A digital signage system according to a second embodiment displays a telop indicating a printing enabled state message independently from original image content while overlapping the printing enabled state message on the original image content, and therefore is different from the digital signage system according to the first embodiment which prepares both image content containing a printing enabled state message and image content not containing a printing enabled state message beforehand, and selects one of the two types of image content.

According to this embodiment, a telop T indicating a printing enabled state message is displayed on a screen showing image content (FIG. 10A, for example) during a printing enabled state of the printer 4 (see FIG. 10B as well), but is not displayed during an printing disabled state of the printer 4.

Figure 10A:
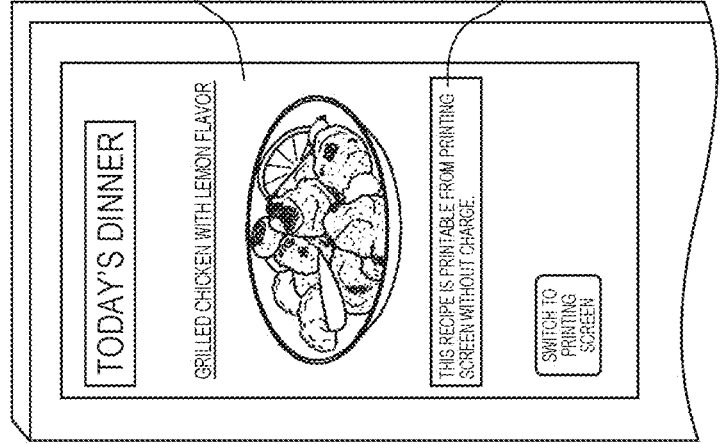
FIGS. 10A and 10B are views illustrating a screen of image content to be displayed on the display device, and a screen of the image content which contains a telop indicating a printing enabled state message, respectively according to a second embodiment.
Figure 10B:
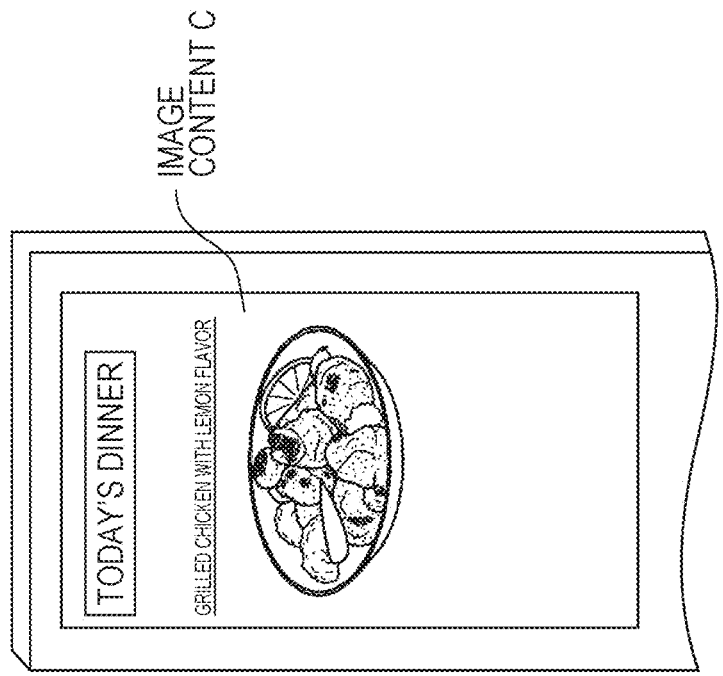

Image content C illustrated in FIG. 10A does not contain the printing enabled state message, and therefore is different in this point from the image content A (FIG. 3A) according to the first embodiment. However, the image content C is similar to the image content A in the point that associated printing data for printing a recipe is prepared, for example.

Figure 11:
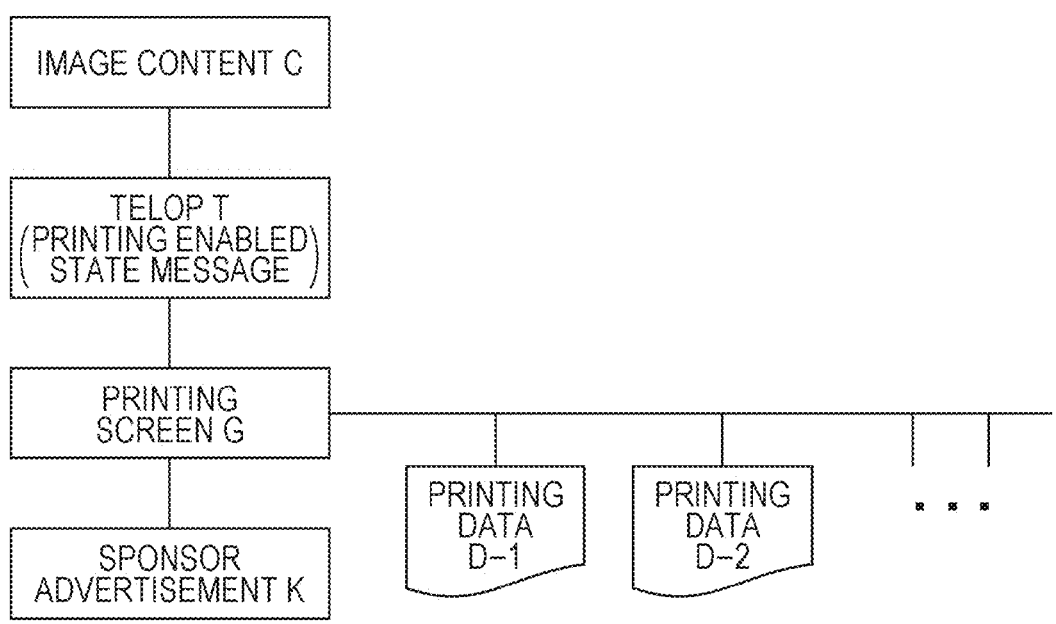
FIG. 11 is a view illustrating a relationship between image content and other images according to the second embodiment.

FIG. 11 illustrates a relationship between the image content C and other images.

As illustrated in this figure, layers lower than the image content C include the printing screen G, the printing data D-1, D-2 and others for printing recipes, and the sponsor advertisement K, for example, similarly to the image content A (FIG. 4). The telop T indicating the printing enabled state message is disposed between the image content C and the printing screen G.

Other basic hardware configurations are similar to the corresponding configurations in the first embodiment. Hereinafter, a display controlling process and a printing receiving process executed by the display controller 3 and corresponding to characteristic parts in this embodiment are chiefly touched upon.

(2) Image Content Display Controlling Process

Figure 12:
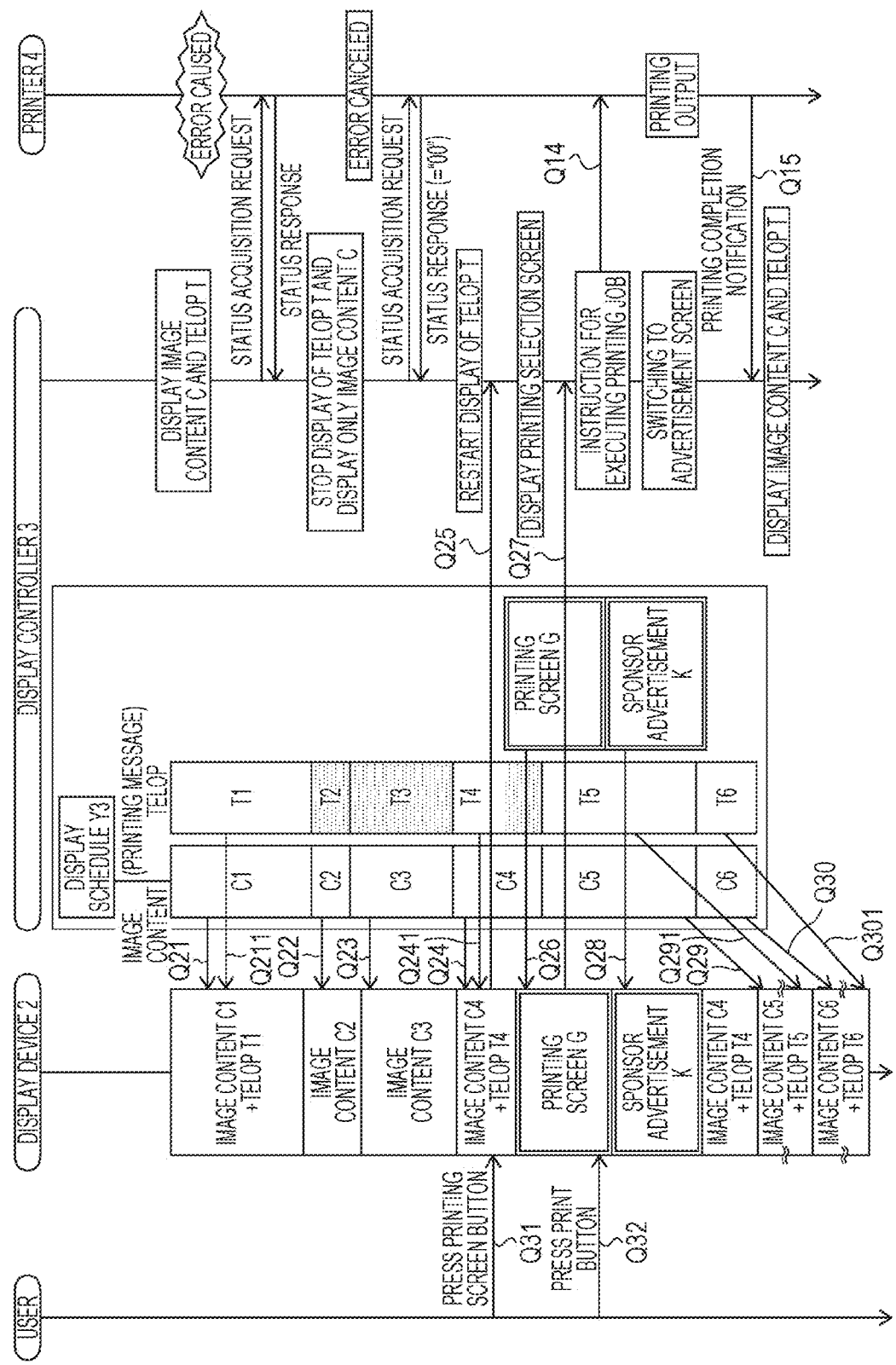
FIG. 12 is a view illustrating an example of sequences executed by a display device, a display controller, and a printer in a display controlling process according to the second embodiment.

FIG. 12 illustrates sequences executed by the display device 2, the display controller 3, and the printer 4 at the time of the image content display controlling process according to this embodiment.

The display controller 3 contains a display schedule Y3 of the image content C in the data storage unit 34, and displays image content C1 through C6 on the display device 2 based on the display schedule Y3. The display schedule Y3, and the image content C1 through C6 are stored in the data storage unit 34 (FIG. 2).

More specifically, the display controller 3 initially reads the image content C1 and a telop T1 indicating the printing enabled state message, and displays the image content C1 and the telop T1 on the display device 2 (Q21, Q211), respectively.

When the printer 4 comes into the printing disabled state as a result of an error of the printer 4 during display of the image content C1 and the telop T1, a telop T2 indicating the printing enabled state message is not displayed during display of the subsequent image content C2. In this case, only the image content C2 is displayed (Q22).

When only the telop T1 is deleted from the screen during display of the image content C1 and the telop T1, the user having noticed this change may feel puzzled. For avoiding this problem, display of the telop is stopped at the time of switching of the image content.

When the error is canceled, display of the telop T indicating the printing enabled state message is restarted (Q241). The restart of display of the telop T is also carried out at the time of switching of the image content.

The sequence executed after a press of the printing screen selection button N1 during the printing enabled state is substantially similar to the corresponding sequence in the first embodiment, wherefore this part of the sequence is not repeatedly explained.

Figure 13:
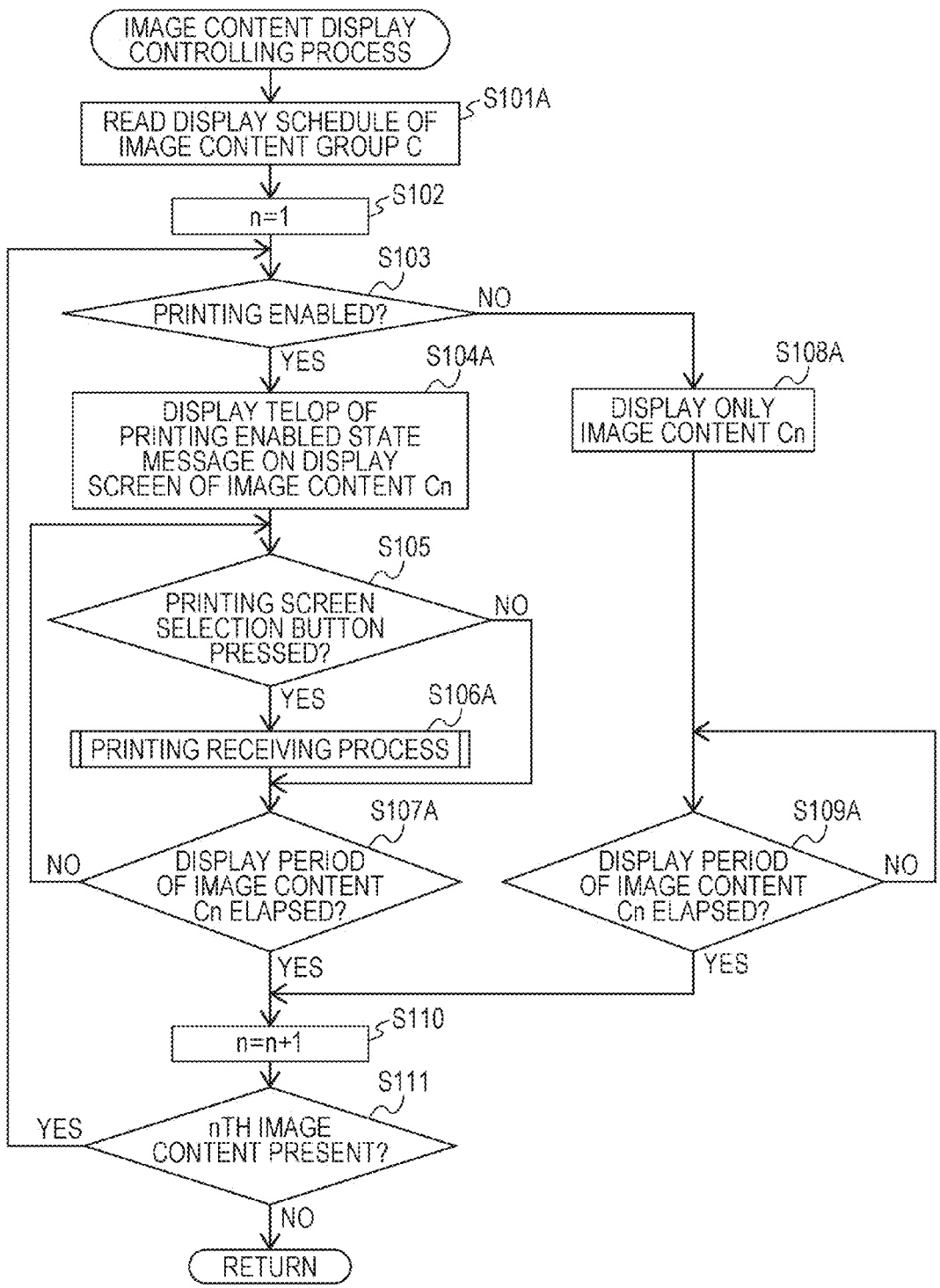
FIG. 13 is a flowchart showing an example of the "image content display controlling process" control executed by the display controller according to the second embodiment.

FIG. 13 is an example of a flowchart showing the contents of the "image content display controlling process" executed by the CPU 31 of the display controller 3 according to this embodiment. In this flowchart, processes similar to the corresponding processes in the flowchart shown in FIG. 8 in the first embodiment have been given similar step numbers. On the other hand, a subscript "A" is attached to each step number of steps for contents slightly different from the contents of the corresponding steps in FIG. 8. As illustrated in FIG. 13, the CPU 31 reads the display schedule Y3 of the image content C in initial step S101A (step S101A), and simultaneously sets the counter value n indicating the order of the displayed image content to "1" (step S102).

Then, the CPU 31 of the display controller 3 checks whether or not the printer 4 is currently in the printing enabled state (step S103). When the printer 4 is in the printing enabled state (step S103: Yes), the display controller 3 reads image content Cn corresponding to the nth image content in the display schedule Y3 from the data storage unit 34, and displays a telop indicating a printing enabled state message while overlapping the telop on the image content Cn (step S104A).

When the printing screen selection button N1 (see FIG. 3A) on the display screen is pressed by the user (step S105: Yes), a process for receiving a printing instruction from the user (printing receiving process) is started (step S106A).

When the printing screen selection button N1 is not pressed (step S105: No), step S106A is skipped.

Figure 14:
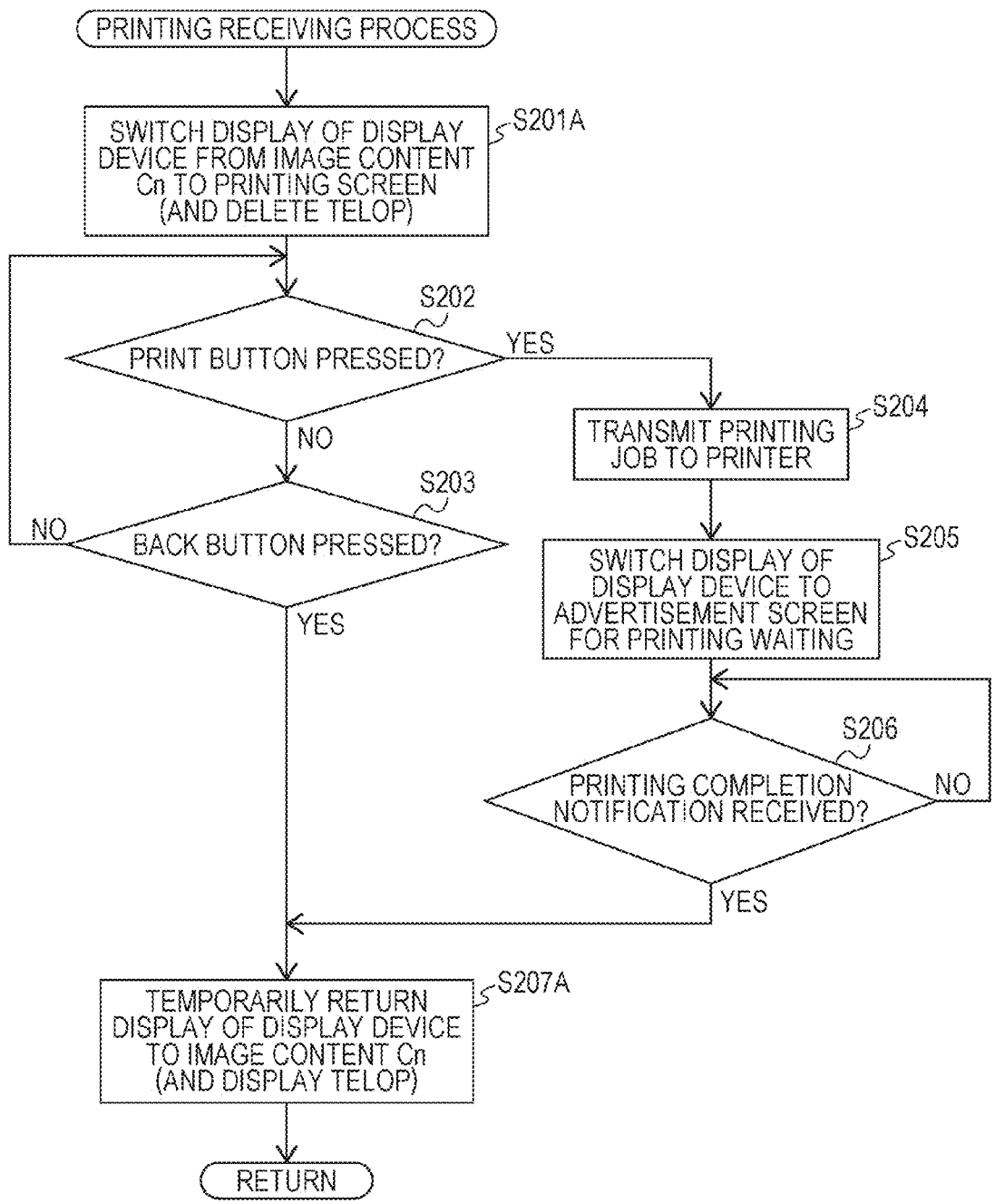
FIG. 14 is a sub routine showing contents of a "printing receiving process" in step S106A in FIG. 13.

FIG. 14 is a flowchart showing contents of a sub routine of the "printing receiving process" executed in step S106A.

As shown in this figure, the CPU 31 initially switches the display of the display device 2 from the image content Cn currently displayed to the printing screen G (see FIG. 3B) for designating printing, and simultaneously deletes the telop indicating the printing enabled state message (step S201A).

When the print button N2 is pressed on this screen after selection of any one of the recipes R1 through R3 (step S202: Yes), the display controller 3 creates a printing job based on the contents selected by the user on the printing screen G, and transmits the printing job to the printer 4 (step S204). The printer 4 having received the printing job outputs printing.

The display controller 3 having transmitted the printing job to the printer 4 switches the display of the display device 2 from the printing screen G to the sponsor advertisement K (FIG. 3C) for the user who are waiting for completion of printing (step S205).

After receiving a printing completion notification from the printer 4 (step S206: Yes), the display controller 3 proceeds to step S207A. In this step, the display controller 3 temporarily restores display of the display device 2 to the image content Cn and displays the telop indicating the printing enabled state message, and then returns to the flowchart of the display controlling process shown in FIG. 13.

When the print button N2 is not pressed in step S202 (step S202: No), the display controller 3 does not execute steps S204 through S206 discussed above, but determines whether or not the back button N3 has been pressed (step S203). When determining that the back button N3 has been pressed (step S203: Yes), the display controller 3 proceeds to step S207. In this step, the display controller 3 displays the image content Cn and the telop indicating the printing enabled state message on the display device 2, and then returns to the flowchart of the display controlling process in FIG. 13.

Returning to FIG. 13, the display controller 3 determines whether or not the display scheduled period of the image content Cn from the display start has elapsed in step S107A. When determining that the display scheduled period has not elapsed yet (step S107A: No), the display controller 3 returns to step S105 to wait for a press of the printing screen selection button. When determining that the display scheduled period has elapsed (step S107A: Yes), the display controller 3 shifts to step S110 to increment the counter value n by "1".

When determining that the printer 4 is not in the printing enabled state in step S103, the display controller 3 reads only the image content Cn (FIG. 10A) in step S108 to display the image content Cn on the display device 2. After an elapse of the display scheduled period (step S109A: Yes), the display controller 3 shifts to step S110 to increment the counter value n by "1".

After the increment of the counter value in step S110, the display controller 3 determines whether or not the nth image content is present with reference to the display schedule of the first or second content group (step S111) to determine whether or not image content to be displayed still remains. When such image content remains (step S111: Yes), the display controller 3 returns to step S103 to determine whether to display the telop indicating the printing enabled state message on the image content Cn based on the determination whether or not the current state is the printing enabled state. Thereafter, the display controller 3 repeats the processes of steps S104A through S109A.

According to this embodiment, the telop T indicating the printing enabled state message is not displayed on the screen of the display device 2 when the printer 4 is in the printing disabled state. In this case, the user does not have a motive for printing the screen of the display device 2 when viewing the screen. Accordingly, effects similar to those of the first embodiment are offered.

In addition, the telop indicating the printing enabled message only needs to be deleted in this embodiment, wherefore the necessity of preparing two types of the first and second content groups as required in the first embodiment is eliminated. Accordingly, the memory capacity necessary for the storage device decreases by the amount of this necessity.

When information such as current time and weather information is displayed in place of the printing enabled state message after deletion of this message, the user may have a favorable impression. In this case, the weather information or the like may be obtained from a dedicated website on the Internet connected with the display controller 3.

According to this embodiment, the CPU 31 of the display controller 3 functions as an acquiring unit for acquiring image content when executing step S104A and S108A in FIG. 13.

In addition, for executing the "image content display controlling process" shown in FIG. 13, the CPU 31 functions as a display control unit which displays printing enabled state information indicating the printing enabled state while overlapping the printing enabled state information on displayed image content when the image forming apparatus is in the printing enabled state, and deletes the printing enabled state information from the screen when determining that the image forming apparatus is in the printing disabled state.

Modified Example

The technical scope of the present invention is not limited to the foregoing embodiments, but may include the following modified examples, for example.

(1) According to the foregoing embodiments, image content is stored in the data storage unit 34 of the display controller 3, and read and acquired from the data storage unit 34. However, the present invention is not limited to this configuration.

For example, image content may be acquired from a server communicatively connected with the display controller 3 via a LAN or the Internet, or from a portable storage medium such as a USB memory attached to the display controller 3, for example.

(2) According to the foregoing embodiments, the display controller of the display device 2 is constituted by a personal computer. However, the present invention is not limited to this configuration.

For example, the printer state checking process, the display control program and the like described in the foregoing embodiments may be installed in a set top box used for an image distribution service or the like, instead of a personal computer, so as to function as a display controller.

(3) According to the foregoing embodiments, each connection between the display device 2 and the display controller 3, and between the display controller 3 and the printer 4 is made via a USB cable. However, the present invention is not limited to this configuration. Other types of dedicated cables such as serial cables and parallel cables may be used for this connection.

Furthermore, this connection may be communicatively made via a wired LAN or a wireless LAN (such as WiFi).

(4) According to the foregoing embodiments, the image content display system is constituted by the display device 2, the display controller 3, and the printer 4 as separate units connected with one another. However, the present invention is not limited to this configuration.

Figure 15:
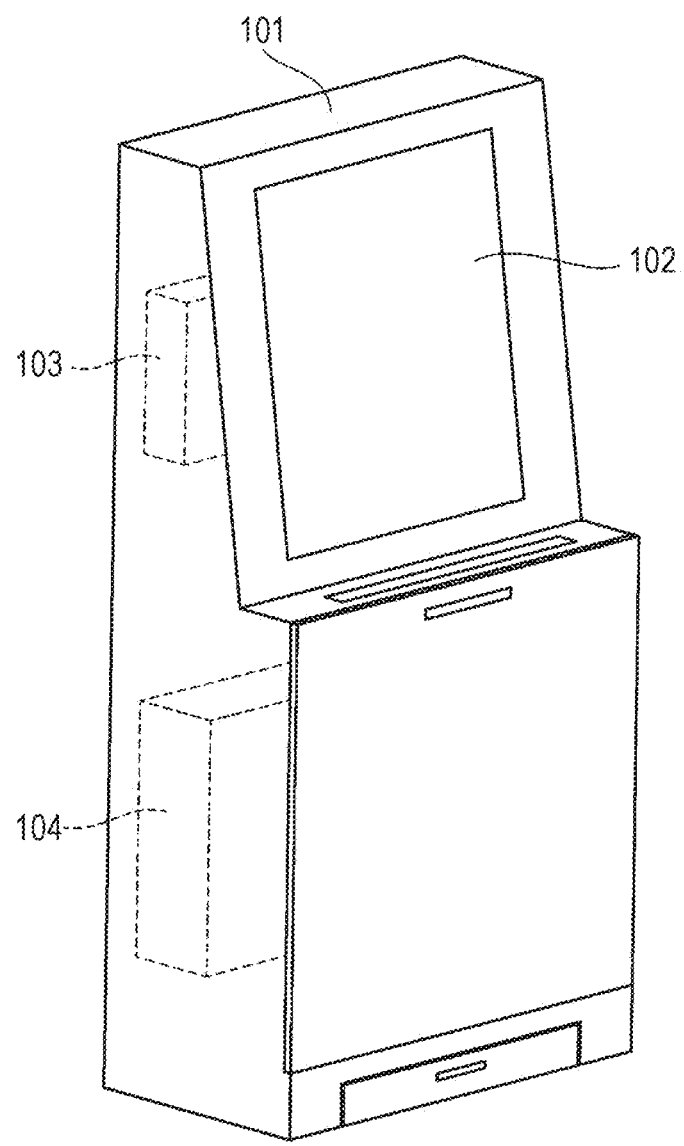
FIG. 15 is a perspective view illustrating a configuration of a digital signage system according to a modified example.

For example, as illustrated in FIG. 15, a display device 102, a display controller 103, and a printer 104 may be accommodated in a common housing 101 to be combined into one body. In this case, advantages of further space saving and more preferable appearance than those of the configuration of the separate units can be offered.

(5) According to this embodiment, image content provided with printing data is sequentially displayed together with the printing enabled state message when the printer 4 is in the printing enabled state. However, printing data is not necessarily required for each image content while the printer 4 is in the printing enabled state. Depending on circumstances, image content partially lacking printing data may be displayed without the printing enabled state message attached to the image content.

(6) The "printing enabled state information notifying the user about the printing enabled condition of printing data (image information) associated with image content presented to the user" according to the present invention is not limited to a sentence contained in the printing enabled message as in the foregoing embodiments. A "print button" or other icons may be used for this notification as long as these button and icons are formed in such shapes as to allow the user to recognize the printing enabled state, and displayed on the screen.

The "printing data associated with image content (image information)" corresponding to a printing target may be an image of image content currently displayed.

(7) According to the foregoing embodiments, the buttons operated by the user for printing (printing screen selection button N1, print button N2, and back button N3) are soft keys displayed on the screen of the display device 2. However, the present invention is not limited to this configuration.

Particularly, the telop T indicating the printing enabled state message (see FIG. 10B) in the second embodiment may have a function as a printing screen selection button.

(8) According to the first embodiment, priority is chiefly given to avoidance of a feeling of strangeness the user viewing the screen may have. More specifically, image content currently displayed is not switched to image content belonging to another content group until an elapse of the display scheduled period of the image content currently displayed, even when a change from the printing enabled state to the printing disabled state is determined in the state determination process.

However, image content may be immediately switched depending on circumstances when a change of the printer state is determined. This configuration can further decrease the possibility that the user uselessly issues a printing instruction even under the printing disabled state of the printer.

Particularly, when the image content A is constituted only by still images and not containing voices such as music and narration, the probability that the user notices interruption of display and feels uncomfortable is low even at the time of interruption of the display and switch to the image content B.

According to the second embodiment, the telop indicating the printing enabled state message is only deleted. Accordingly, it is considered that the user does not have a feeling of considerable strangeness even when the telop is deleted before an elapse of the display scheduled period.

This applies to the time of switching of the display screen to the image content A, and redisplay of the telop based on determination that the printing disenabled state has been restored to the printing enabled state after cancellation of the error of the printer 4.

(9) According to the foregoing embodiments, the user selects one of the three types of recipes, and presses the print button N2 for printing (see FIG. 3B) under display of the printing screen G after the temporary switching to this screen. However, the present invention is not limited to this configuration.

For example, a printing instruction may be directly issued from a screen of initial image content containing display of the printing enabled state message so as to print associated image information.

(10) According to the foregoing embodiments, the display controller 3 transmits a status acquisition request to the printer 4, and determines whether or not the printer 4 is in the printing enabled state based on a status response transmitted from the printer 4 in response to the request. However, the present invention is not limited to this configuration.

For example, the printer 4 may be configured to spontaneously transmit status information to the display controller 3 every time the status information of the printer 4 changes. In this case, the display controller 3 determines that the state of the apparatus does not change while receiving no status information.

(11) According to the foregoing embodiments, the image content A4 at the time of printing operation is temporarily restored and displayed after completion of printing (see step S207 in FIGS. 7 and 9). However, the present invention is not limited to this configuration. For example, the subsequent image content A5 may be displayed in place of the image content A4.

This applies to the second embodiment.

(12) According to the foregoing embodiments, the error notification (step S14 in FIG. 6) is transmitted to the system manager in the form of an electronic mail. However, the present invention is not limited to this configuration.

For example, an error message may be displayed via a website or the like on a management screen of a management terminal used by the system manager.

(13) According to the foregoing embodiments, the touch detection method of the touch panel is not particularly discussed. This method is not particularly limited but may be arbitrarily determined, such as infrared method, resistive membrane method, electrostatic capacitance method, electromagnetic induction method, surface acoustic wave method, or other methods.

In addition, the unit for receiving an instruction based on touch operation of the user may be units other than the touch panel. For example, the display device 2 may include a camera which images an action of the user, and analyzes image data obtained by imaging to specify a touch position of the user on the display screen.

(14) According to the foregoing embodiments, a digital signage system chiefly used as a tool for advertisement and sales promotion for commercial use has been discussed as an example of the image content display system. However, the present invention is not limited to this configuration.

For example, the image content display system may be applied to any types of systems configured to display information on a display device and produce printed matters associated with the displayed information, such as public information and various types of guidance within schools or companies.

The contents of the foregoing embodiments and the modified examples may be combined into any possible combinations.

The image content display system according to the present invention is a useful technology applicable to display control performed when image information associated with displayed image content is in a printing enabled condition.

According to an embodiment of the image content display system of the present invention, the display controller determines whether or not the image forming apparatus is in the printing enabled state. When determining that the image forming apparatus is in the printing disabled state, the display controller displays the image content of the second content group not containing the printing enabled state information. According to this configuration, the printing enabled state information is not displayed on the screen of the display device during the printing disabled state. Accordingly, the user does not have such an expectation that printing is workable. Originally, the user is not given such information that printing is workable, and therefore does not have a motive for printing. Accordingly, a situation causing discomfort to the user is difficult to occur even when printed matters are not output.

According to an embodiment of the image content display system of the present invention, the display controller determines whether or not the image forming apparatus is in the printing enabled state. When determining that the image forming apparatus is in the printing disabled state, the display controller deletes the printing enabled state information from the screen of the display device.

This configuration offers effects similar to those of the embodiment noted above.

Although the present invention has been described and illustrated in detail, it is clearly understood that the same is by way of illustrated and example only and is not to be taken by way of limitation, the scope of the present invention being interpreted by terms of the appended claims.

What is claimed is:

1. An image content display system comprising:
a display device;
a display controller that displays image content on the display device while switching a plurality of sets of image content; and
an image forming apparatus that prints image information associated with image content displayed on the display device, wherein
the display controller is configured to:
acquire image content of a first content group containing, within an image, printing enabled state information for notifying a user that printing of the associated image information is enabled,
acquire image content of a second content group not containing the printing enabled state information within an image,
determine whether or not the image forming apparatus is in a printing enabled state, and
display the image content of the first content group when the image forming apparatus is in the printing enabled state, and switches image content to be displayed on the display device from the image content of the first content group to the image content of the second content group when a state change of the image forming apparatus to a printing disabled state is determined during display of the image content of the first content group.

2. The image content display system according to claim 1, wherein the display controller switches image content to be displayed on the display device from the image content of the second content group to the image content of the first content group when the display controller determines that the state of the image forming apparatus is restored from the printing disabled state to the printing enabled state during display of the image content of the second content group.

3. The image content display system according to claim 1, wherein
   each of the sets of the image content of the second content group is alternative content of the corresponding image content of the first content group, and
   the display controller switches image content to be displayed on the display device to the image content of the second content group corresponding to the image content of the first content group which should be displayed under the printing enabled state when the display controller determines that the image forming apparatus is in the printing disabled state during display of the image content of the first content group.

4. The image content display system according to claim 1, wherein
   a display scheduled period is allocated to each of the sets of the image content of the first and second content groups, and
   the display controller switches image content currently displayed after an elapse of the display scheduled period of the corresponding image content in switching image content to be displayed on the display device between the first content group and the second content group.

5. An image content display system comprising:
   a display device;
   a display controller that displays image content on the display device while switching a plurality of sets of image content; and
   an image forming apparatus that prints image information associated with image content displayed on the display device, wherein
   the display controller is configured to:
      acquire the plurality of sets of image content,
      determine whether or not the image forming apparatus is in a printing enabled state, and
      display, in displaying the image content, printing enabled state information notifying a user that printing is enabled while overlapping the printing enabled state information on an image of the image content when the image forming apparatus is in the printing enabled state, and deletes the printing enabled state information from a screen of the display device when a state change of the image forming apparatus to a printing disabled state is determined during display of the image content and the printing enabled state information.

6. The image content display system according to claim 5, wherein the display controller displays the printing enabled state information on an image of image content when the display controller determines that the state of the image forming apparatus is restored from the printing disabled state to the printing enabled state after deletion of the printing enabled state information from the screen of the display device.

7. The image content display system according to claim 6, wherein
   a display scheduled period is allocated to each of the plurality of sets of acquired image content, and
   the display controller displays the printing enabled state information on the screen or deletes the printing enabled state information from the screen at the time of switching to subsequent image content after an elapse of the display scheduled period of image content currently displayed.

8. A display controller that displays image content on a display device while switching a plurality of sets of image content, and allows an image forming apparatus to print image information associated with image content displayed on the display device, wherein the display controller is configured to:
   acquire image content of a first content group containing, within an image, printing enabled state information for notifying a user that printing of the associated image information is enabled;
   acquire image content of a second content group not containing the printing enabled state information within an image;
   determine whether or not the image forming apparatus is in a printing enabled state; and
   display the image content of the first content group when the image forming apparatus is in the printing enabled state, and switches image content to be displayed on the display device from the image content of the first content group to the image content of the second content group when a state change of the image forming apparatus to a printing disabled state is determined during display of the image content of the first content group.

9. A display controller that displays image content on a display device while switching a plurality of sets of image content, and allows an image forming apparatus to print image information associated with image content displayed on the display device, wherein the display controller is configured to:
   acquire the plurality of sets of image content;
   determine whether or not the image forming apparatus is in a printing enabled state; and
   display, in displaying the image content, printing enabled state information notifying a user that printing is enabled while overlapping the printing enabled state information on an image of the image content when the image forming apparatus is in the printing enabled state, and deletes the printing enabled state information from a screen of the display device when a state change of the image forming apparatus to a printing disabled state is determined during display of the image content and the printing enabled state information.

* * * * *